June 7, 1932.  G. M. BELLANCA  1,861,902
STRUT CONSTRUCTION
Filed Nov 8, 1930
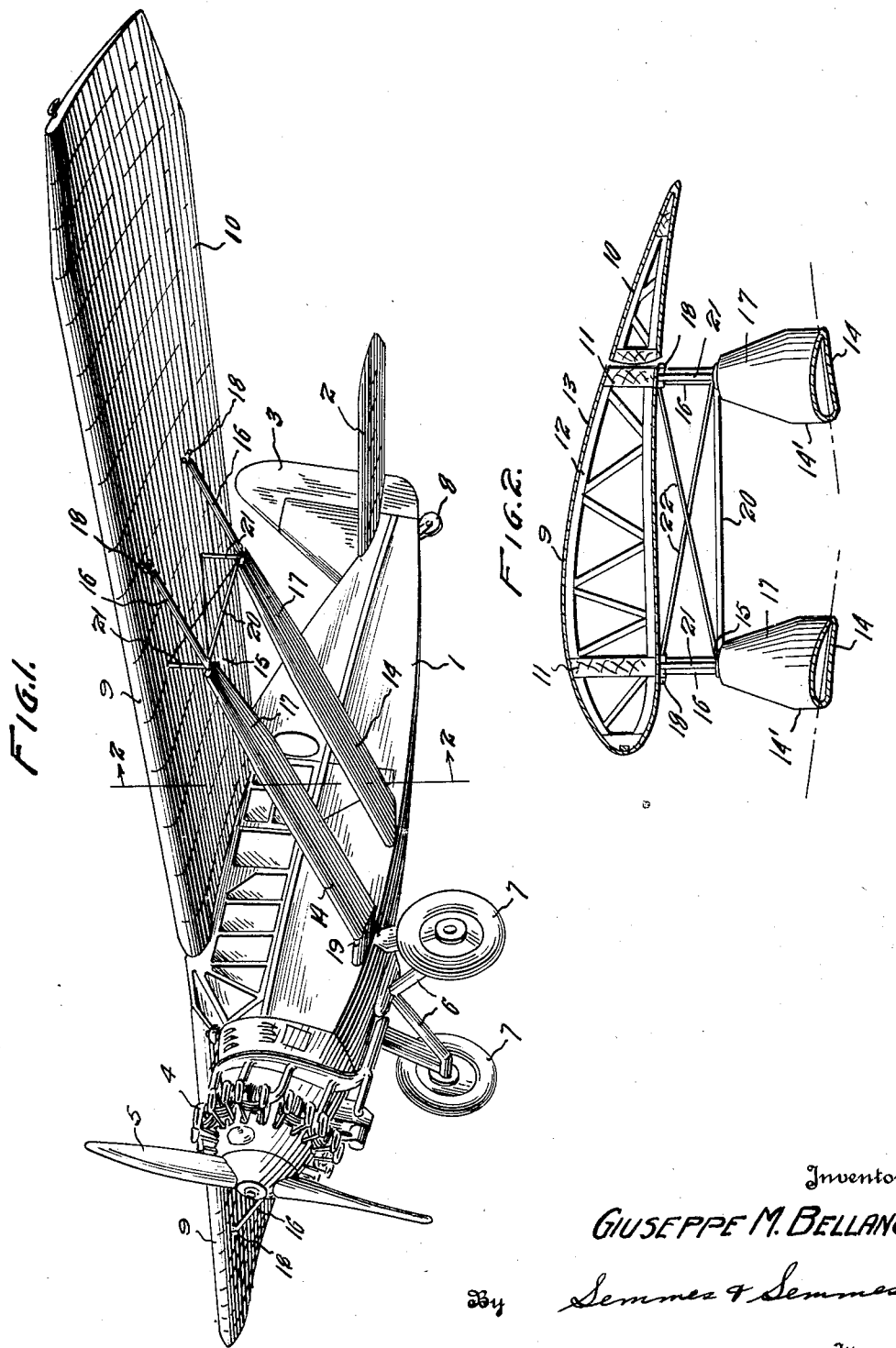
Inventor
GIUSEPPE M. BELLANCA
By Semmes & Semmes
Attorneys Patented June 7, 1932

1,861,902

UNITED STATES PATENT OFFICE

GIUSEPPE M. BELLANCA, OF NEW CASTLE, DELAWARE

STRUT CONSTRUCTION

Application filed November 8, 1930. Serial No. 494,361.

The invention relates to airplanes and more particularly has reference to strut members and an arrangement for the same.

In the past struts or compression members employed for bracing, between the wing surfaces of an airplane or between a wing surface and the fuselage have generally been given a circular cross section. In some instances a strut of this type has had a fairing added thereto so as to produce a stream lined section. Other constructions have also been employed for effecting such a section. However, but little attention has been given to forming a strut of sufficient size and such shape as to provide a lifting surface, the art considering chiefly the advantage of eliminating parasitic resistance by stream lining the struts and making them of as small a cross section as is structurally feasible.

The major object of this invention is the provision of an airplane strut provided with a lifting surface.

An equally important object of the invention is the designing of a construction allowing a plurality of struts provided with lifting surfaces to be attached to a wing of an airplane for the purpose of supporting the same.

Yet another object of the invention is the designing of an airplane strut having a lifting surface portion adapted to be connected to the fuselage of a plane and an extension column member connected to a wing of the plane, the lifting surface of the strut being so positioned with respect to the wing of the plane with which it is associated as to substantially prevent interference between air currents adjacent said wing and the lifting surface.

A further object of the invention is the provision of a plurality of struts provided with lifting surfaces, the struts being connected to the fuselage and a wing of the plane and positioned in tandem relation one behind the other.

Still a further object of the invention is the provision of a design allowing the use of a plurality of lift struts, the struts being positioned in tandem from the leading to the trailing edge of the wing on each side of the fuselage, each strut being connected to the fuselage and the wing, the struts adjacent the wing being additionally supported by a cross frame which also ties the struts together.

Still another object of the invention is the provision of a truss framework whereby the wing supporting end of a strut may be spaced from the wing surface and interference of air currents prevented.

Still another object of the invention is the provision of a plurality of struts provided with lifting surfaces, the struts being connected to the fuselage and a wing of the plane and positioned in tandem relation one behind the other, the foremost of said struts being arranged with a positive angle of incidence and the rearmost with a negative angle of incidence.

Yet a further object of the invention is the provision of a plurality of struts provided with lifting surfaces, said struts being arranged so as to increase both lateral and longitudinal stability of the airplane.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The invention comprehends the provision of a novel strut or a compression member for supporting the wings of an airplane, and also includes the positioning of a plurality of struts in tandem, one behind the other. One method of practically effecting the concept of the invention is the provision of a strut having an elongated lifting surface portion adapted to be connected to the fuselage of the plane. To the lifting surface portion is secured an extension column member which is also connected to the wing with which the strut is associated.

In use the struts on the same side of the fuselage are positioned parallel to each other and have their upper ends connected to the wing surface along the same chord of the wing and their lower ends connected to the fuselage. For the purpose of strongly supporting the struts and tying them together, a novel cross frame construction which is connected to the extension column members and the wing is employed.

In order to make my invention more clearly understood, I have shown in the accompanying drawing, means for carrying the same into practical effect without limiting the improvements in their useful applications to the particular constructions which, for the purpose of explanation, have been made the subject of illustration.

In the drawing:

Figure 1 is a perspective view of an airplane having the struts forming the subject matter of the invention employed thereon.

Figure 2 is a partial sectional elevation taken along the line 2—2 of Figure 1 and shows in detail the connection of the struts to the wing.

Throughout the drawing similar reference numerals refer to like parts in the different views. Shown in Figure 1 is an airplane having a fuselage 1, of the cabin type, upon which are provided the customary tail surfaces 2, and rudder 3. The plane is driven by a suitable motor 4 to which is connected a propeller 5. Secured to the lower part of the fuselage is a landing gear 6, of any convenient design, provided with wheels 7. A tail supporting wheel 8 is also disclosed. Mounted upon the fuselage is a wing 9 provided with ailerons 10.

Wing 9 may be of any desired airfoil section and is formed of the usual spars 11, ribs 12, and surfacing material 13. The wing construction may be one of the all-metal type or the ribs and spars may be formed of wood and a suitable fabric covering material employed.

For the purpose of supporting the wing 9, I have disclosed a novel form of strut which comprises a lifting surface portion 14 having an airfoil section (Figure 2) of any desired type to the end 15 of which is secured an extension column member 16.

The lifting surface portion 14 of each strut is formed of a spar and rib construction, which for the purpose of simplifying the drawing has been omitted. Upon the spar and rib construction just mentioned, there is placed suitable surfacing or covering material 14'.

There is secured to the end of the lifting surface portion of each strut, as previously pointed out, an extension column member 16. The extension column member 16 is so positioned upon the lifting surface portion that the center of gravity of its cross section coincides with the center of gravity of the cross section of the lifting section portion, thus preventing the load transmitted to the lifting surface portion through the extension column member from being applied eccentrically. As may be observed in Figure 1, each column member possesses a relatively small cross section, when compared with that of the lifting surface portion of the strut. It is also to be observed that the extension column members are stream lined.

It should be noted that the end of the lifting surface portion of each strut, adjacent its extension column, has an outward taper 17. Thus it may be observed that the end 15 of the lifting surface portion possesses a smaller cross section than the main body of the lifting surface. Because of the taper just mentioned, the cross sectional area of the lifting surface portion progressively increases from a minimum at its end 15 to a maximum where the taper joins the main body of the lifting surface.

In positioning the struts so that they may function as compression members for supporting the wing, the end of each extension member is secured to the wing of the plane, while the free end of the lifting surface portion is connected to the fuselage. The struts are arranged in pairs on opposite sides of the fuselage, although more than two on each side of the wing may be employed if desired. Thus there is provided a forward strut and a rearward strut for each semi-span of the wing, which have their upper or extension column ends connected to the wing along the same wing chord. The free end of each extension column member 12 is secured to a suitable fitting 18 which is attached to one of the spars of the wing. A short stub wing 19, of any suitable airfoil design, is mounted upon each side of the fuselage adjacent the landing carriage, and to this the free end of the lifting surface of the forward strut is secured. As shown in the drawing, the free end of the lifting surface of the rearward strut is attached directly to the lower portion of the fuselage without the use of a stub wing.

It is to be understood, however, that the free ends of the lifting surface portions of both struts may be directly connected to the fuselage or connected thereto through the medium of a stub wing. In some instances it may be desirable to connect the free end of the lifting surface of the forward strut to the landing gear of the plane. Such practice, it is to be understood, may be followed without departing from the spirit of the invention or the scope of the appended claims.

It is noted that the forward lift strut of this application is shown with a positive angle of incidence and that the rearward strut is shown with a negative angle of incidence. This is very clearly illustrated in Figure 2 of the drawing. This arrangement of struts serves to very materially increase the longitudinal stability of the airplane. The probable explanation of this is as follows: The resultant lift on the lifting surface portion of each strut is normal to the strut. It will readily be seen that the normals to the struts as illustrated in Figure 2 would intersect at a point above the wing. Thus it will be seen that each of these struts exerts a force tending to prevent any loss of longitudinal stability. This is of great importance and is a result which has been constantly sought after in airplane research and design. The attachment of the struts to the wing is well shown in both Figures 1 and 2 and comprises a horizontal tie rod 20, the ends of which are secured, in any convenient manner, to each of the extension column members of the struts. The tie rod 20 is substantially parallel to the wing and is positioned adjacent the tapered end 15 of the lifting surface of each strut. Also connected to each extension column member adjacent the cross tie 20, is a vertical hanger or column 21. The upper end of each column 21 is suitably secured to the wing. This connection may be made through means of a fitting if desired.

For providing further bracing to the construction just described, crossed tie wires 22 are employed. These wires are connected adjacent the wing surface to the vertical hanger 21 and have their other ends secured to the lower end of the opposite hanger. In effect they provide diagonal tension members of a truss construction and are placed under tension before having their ends secured as described.

All of the members of the tie frame construction just described, may be suitably stream lined so as to reduce parasitic resistance.

Each extension column member may be formed integral with its lifting surface portion if desired. Also it may be constructed of the same material as the spars and ribs of the lifting surface portion. However, in some instances, metal tubular construction is preferred, although it is to be understood that I-beams, T-beams, built-up box girders, or other structural beams and forms may be employed if desired. In the latter instances, the extension column members may be covered with suitable fabric and stream lined or any other method of stream lining may be employed.

The spars and ribs of the lifting surfaces of the struts are constructed of wood or metal as desired. Fabric surfacing material or metal may be used for covering the framework formed by the spars and ribs.

The advantages to be derived from a strut of this construction will at once be apparent. Besides affording compression members for the support of the wing, an additional lifting surface is provided. This increase in lifting surface is accompanied without the loss of efficiency of the airplane, which occurs in a triplane or biplane having the same wing surface area as a monoplane, due to the interference of air currents passing adjacent to upper and lower wings.

By the use of the extension column members which allow the airfoil section of the strut to be stopped a considerable distance below the bottom surface of the wing, interference of air currents adjacent the lifting surface of the struts and the wing is substantially prevented. This interference is further prevented by providing the tapered portion 17 near the end of the lifting surface of each strut.

Another feature of the lift strut construction resides in the fact that their use increases the lateral stability of the airplane. The resultant lift on the lifting surface portion of each strut is normal to the strut. It will be appreciated that when the lines of resultant lift for similar sections on struts directly opposite each other on different sides of the fuselage are drawn, they will intersect each other above the fuselage. This point, it will be appreciated is above the center of gravity of the airplane. Hence there is always a positive force tending to prevent the ship from losing lateral stability or to prevent it from rolling.

The resultant lift on the struts also tends to prevent the ship from pitching downwardly and aids in controlling its longitudinal stability. Besides the effect of aiding the longitudinal stability the struts are of benefit in that they may be so positioned as to allow the plane to climb at an increased angle of attack.

While the invention has been shown as applied to a monoplane of the cabin type, it will be understood that the invention may be associated with other types of monoplanes as well as biplanes and triplanes. When a multiwing ship has the strut construction forming the subject matter of this invention employed therewith, the struts may be either connected to the fuselage or to the upper wing surface of a lower plane.

From the foregoing description it will be appreciated that I have provided a novel strut construction for an airplane which not only provides compression members for supporting the wing, but also affords a lifting surface portion whereby the effective wing area of the plane is increased. It is also to be observed that a strong and rigid bracing for the struts of the invention when arranged in tandem relation has been devised. With the use of struts in tandem not only is the stability of the plane greatly increased but a more rigid and stronger support for the wing surfacing is provided.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. In an airplane, a plurality of wing supporting struts at least one of said struts having an airfoil surface permanently arranged with a negative angle of incidence.

2. In an airplane, a plurality of wing-supporting struts, at least two of said struts having airfoil surfaces permanently arranged with different angles of incidence.

3. In an airplane, a plurality of wing-supporting struts, at least one of said struts having an airfoil surface permanently arranged with a positive angle of incidence, and at least one other of said struts having an airfoil surface permanently arranged with a different angle of incidence from said first mentioned strut.

4. In an airplane, a plurality of wing-supporting struts, the foremost of said struts having an airfoil surface permanently arranged with a positive angle of incidence, and the rearmost of said struts having an airfoil surface permanently arranged with a different angle of incidence from said foremost strut.

5. In an airplane, a plurality of wing-supporting struts, at least one of said struts having an airfoil surface permanently arranged with a positive angle of incidence, and at least one other of said struts having an airfoil surface permanently arranged with a negative angle of incidence.

6. In an airplane, a plurality of wing-supporting struts, the foremost of said struts having an airfoil surface permanently arranged with a positive angle of incidence, and the rearmost of said struts having an airfoil surface permanently arranged with a negative angle of incidence.

7. In an airplane, a wing-supporting strut having an airfoil surface with a permanent negative angle of incidence.

8. An airplane comprising, in combination, a fuselage, a sustaining wing extending laterally from each side of the top of said fuselage, a stub wing projecting laterally from each side of said fuselage at the bottom of same, wing supporting strut members attached to the outer ends of each of said stub wings and to the lower surfaces of each of said sustaining wings, other wing supporting strut members attached to the sides of the fuselage at its bottom and to the lower surfaces of each of said sustaining wings, said first mentioned strut members having airfoil surfaces with positive angles of incidence, and said second mentioned strut members having airfoil surfaces with negative angles of incidence.

9. An airplane comprising, a fuselage, a sustaining wing extending laterally from each side of the fuselage, a plurality of struts having an airfoil surface extending from each side of said fuselage to said sustaining wing, the foremost of said struts permanently arranged with a positive angle of incidence and the rearmost of said struts permanently arranged with a negative angle of incidence.

10. An airplane comprising a fuselage, a sustaining wing extending laterally from each side of the fuselage, said sustaining wing being provided on each side with an aileron, a plurality of struts each having an airfoil surface extending from each side of said fuselage to said sustaining wing, the foremost of said struts permanently arranged with a positive angle of incidence and the rearmost of said struts permanently arranged with a negative angle of incidence.

11. An airplane comprising, a fuselage, a sustaining wing extending laterally from each side of the top of the fuselage, a plurality of struts each having an airfoil surface, one end of each of said struts being connected to said fuselage and the other end of said struts having an extension member of smaller cross-section for connection to the sustaining wing, the foremost of said struts permanently arranged with a positive angle of incidence and the rearmost of said struts permanently arranged with a negative incidence.

12. An airplane, comprising a fuselage, a sustaining wing extending laterally from each side of the top of the fuselage, a plurality of struts each having an airfoil surface, one end of each of said struts being connected to the fuselage and the other end of said struts having an extension member of smaller cross-section for connection to the sustaining wing, a bracing member positioned between the extension members on each side of the fuselage and members extending vertically from said bracing member to the sustaining wing for providing an additional support for each of said struts, the foremost of said struts permanently arranged with a positive angle of incidence and the rearmost of said struts permanently arranged with a negative angle of incidence.

In testimony whereof I affix my signature.

GIUSEPPE M. BELLANCA.